(12) United States Patent  
DelGaudio et al.

(10) Patent No.: US 8,793,368 B2
(45) Date of Patent: *Jul. 29, 2014

(54) METHOD AND SYSTEM FOR ENTERPRISE-WIDE MIGRATION

(75) Inventors: Carol I. DelGaudio, Williston, VT (US); Scott D. Hicks, Underhill, VT (US); William M. Houston, Newburgh, NY (US); Rachele Shannon Kurtz, Cary, NC (US); Victoria A. Locke, Newburgh, NY (US); James A. Martin, Jr., Endicott, NY (US); Donald P. Mummey, Omaha, NE (US); Douglas G. Murray, Johnson City, NY (US); Jeffrey E. Prince, Bloomfield Hills, MI (US); Richard R. Pritsky, Williston, VT (US); Diana C. Rauch, Sunset Beach, NC (US)

(73) Assignee: Ebay Inc., San Jose, CA (US)

( * ) Notice: Subject to any disclaimer, the term of this patent is extended or adjusted under 35 U.S.C. 154(b) by 885 days.

This patent is subject to a terminal disclaimer.

(21) Appl. No.: 12/727,109

(22) Filed: Mar. 18, 2010

(65) Prior Publication Data

US 2010/0257072 A1 Oct. 7, 2010

Related U.S. Application Data

(60) Division of application No. 11/186,211, filed on Jul. 21, 2005, now Pat. No. 7,725,352, which is a continuation-in-part of application No. 10/728,520, filed on Dec. 4, 2003, now Pat. No. 7,685,027.

(51) Int. Cl.
*G06Q 10/00* (2012.01)

(52) U.S. Cl.
USPC .......................................................... 709/224

(58) Field of Classification Search
USPC .......................................................... 705/200
See application file for complete search history.

(56) References Cited

U.S. PATENT DOCUMENTS

| 5,678,044 | A | 10/1997 | Pastilha et al. |
| 5,930,806 | A | 7/1999 | Taira et al. |
| 6,269,382 | B1 | 7/2001 | Cabrera et al. |
| 6,496,977 | B1 | 12/2002 | Hamilton, II et al. |
| 6,615,166 | B1 | 9/2003 | Guheen et al. |
| 6,728,877 | B2 | 4/2004 | Mackin et al. |
| 6,795,835 | B2 | 9/2004 | Ricart et al. |
| 7,725,352 | B2 * | 5/2010 | DelGaudio et al. ............. 705/22 |
| 2002/0069213 | A1 | 6/2002 | Moslander et al. |
| 2002/0073106 | A1 * | 6/2002 | Parker et al. .................. 707/200 |
| 2003/0130980 | A1 | 7/2003 | Bell et al. |
| 2003/0167354 | A1 | 9/2003 | Peppers et al. |

(Continued)

*Primary Examiner* — Shay S Glass
(74) *Attorney, Agent, or Firm* — Haynes and Boone, LLP

(57) ABSTRACT

Disclosed are a method, system and computer program for collecting inventory data about a group of machines at an office. This method comprises the steps of running an inventory tool on each of the machines, and the tool presenting dialog displays on each of the machines, filling in or changing data in the dialogs presented by the tool, and submitting the collected information to a server. Also disclosed are a method, system and computer program for customizing an inventory data collection tool for a plurality of logical groups of users. Each of the logical groups of users is provided with a copy of the inventory data collection tool and with a first copy of a common control file. Each of the groups of users uses the first copy of the common control file to customize the tool for the group of users.

12 Claims, 22 Drawing Sheets

(56) References Cited

U.S. PATENT DOCUMENTS

| | | |
|---|---|---|
| 2004/0128203 A1 | 7/2004 | Pierre et al. |
| 2004/0194055 A1 | 9/2004 | Galloway et al. |
| 2005/0055357 A1 | 3/2005 | Campbell |
| 2005/0086457 A1 | 4/2005 | Hohman |
| 2007/0136722 A1 | 6/2007 | Lesher et al. |

* cited by examiner

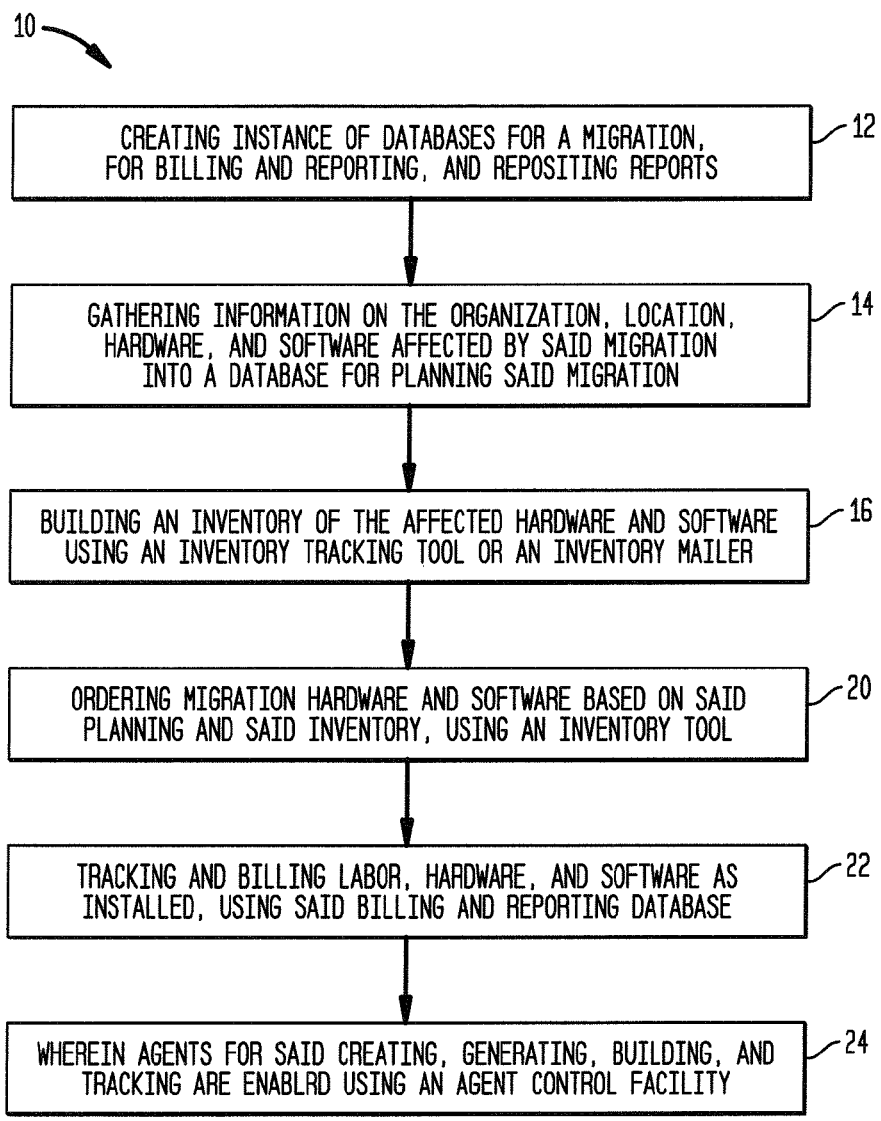

FIG. 2

| PROCESS | TOOLSUITE COMPONENT(S) |
|---|---|
| 32 — WORKLOAD PLANNING | -ETHERNET MIGRATION MANAGER (EMM) DATABASE |
| 34 — MACHINE/CLIENT INVENTORY INFORMATION GATHERING | -ETHERNET MIGRATION MANAGER INVENTORY TRACKING (EMMIT) TOOL<br>-MOBILE ETHERNET MIGRATION MANAGER INVENTORY TRACKING (MOBILE EMMIT) TOOL<br>-ADAPTER BY EXCEPTION (ABE) TOOL |
| 36 — CUSTOMER CONTACT MANAGEMENT | -ETHERNET MIGRATION MANAGER INVENTORY TRACKING MAILER (EMMIT MAILER) DATABASE<br>-ADAPTER BY EXCEPTION MAILER (ABE MAILER) DATABASE |
| 40 — DEPLOYABLE COMPONENT INVENTORY CONTROL AND FORECASTING | -ETHERNET MIGRATION MANAGER (EMM) DATABASE |
| 42 — LABOR TRACKING AND BILLING | -ETHERNET MIGRATION MANAGER (EMM) DATABASE<br>-ETHERNET MIGRATION MANAGER BILLING AND REPORTING (EMM BAR) DATABASE |
| 44 — DEPLOYABLE COMPONENT TRACKING AND BILLING | -ETHERNET MIGRATION MANAGER (EMM) DATABASE<br>-ETHERNET MIGRATION MANAGER BILLING AND REPORTING (EMM BAR) DATABASE<br>-ETHERNET MIGRATION MANAGER REPORT REPOSITORY (EMM RR) DATABASE |
| 46 — PROJECT REPORTING AND MEASUREMENTS | -ETHERNET MIGRATION MANAGER (EMM) DATABASE<br>-ETHERNET MIGRATION MANAGER BILLING AND REPORTING (EMM BAR) DATABASE<br>-ETHERNET MIGRATION MANAGER REPORT REPOSITORY (EMM RR) DATABASE |
| 50 — DATABASE INSTANCE CREATION, MANAGEMENT AND CONFIGURATION | -EMM INSTANCE MANAGER (EMM IM) DATBASE<br>-EMM DOCUMENTATION AND RULES (EMM DR) DATABASE |
| 52 — CENTRALIZED DATA PROCESSING AGENT EXECUTION | -EMM AGENT CONTROL (EMM AC) DATABASE |
| 54 — CLIENT INFORMATION ORGANIZATIONAL AND LOCATION INFORMATION | -CLIENT INFOMATION REPOSITORY (INFO.NSF) DATABASE |

FIG. 3

| TOOLSUITE COMPONENT | DESCRIPTION |
|---|---|
| 60 — ETHERNET MIGRATION MANAGER (EMM) DATABASE | A LOTUS DOMINO DATABASE WHICH CONTAINS ONE ENTRY FOR EACH CLIENT AND/OR MACHINE AND/OR DEVICE BEING EFFECTED BY THE MIGRATION. EACH ENTRY CONTAINS INFORMATION ABOUT THE OWNER, LOCATION, MIGRATION STATUS, LABOR REQUIED, COMPONENT(S) DELIVERED, ETC. |
| 62 — ETHERNET MIGRATION MANAGER INVENTORY TRACKING (EMMIT) TOOL | A WINDOWS EXECUTABLE WHICH GATHERS INFORMATION ABOUT A CLIENT AND/OR MACHINE AND/OR DEVICE AND TRANSMITS THIS INFORMATION TO EMM. |
| 64 — MOBILE ETHERNET MIGRATION MANAGER INVENTORY TRACKING (MOBILE EMMIT) TOOL | A WINDOWS EXECUTABLE (MAILABLE TO REMOTE EMPLOYEES) WHICH GATHERS INFORMATION ABOUT A CLIENT AND/OR MACHINE AND/OR DEVICE AND TRANSMITS THIS INFORMATION TO THE EMMIT MAILER. |
| 66 — ETHERNET MIGRATION MANAGER INVENTORY TRACKING MAILER (EMMIT MAILER) DATABASE | A LOTUS DOMINO DATABASE WHICH CONTAINS ONE ENTRY FOR EACH REMOTE EMPLOYEE WHO HAS BEEN SENT THE EMMIT MAILER TOOL. |
| 70 — ADAPTER BY EXCEPTION (ABE) TOOL | A WINDOWS EXECUTABLE (MAILABLE TO EMPLOYEES REQUIRING MIGRATION UPON DEMAND) WHICH GATHERS INFORMATION ABOUT A CLIENT AND/OR MACHINE AND/OR DEVICE AND TRANSMITS THIS INFORMATION TO EMM. |
| 72 — ADAPTER BY EXCEPTION MAILER (ABE MAILER) DATABASE | A LOTUS DOMINO DATABASE WHICH CONTAINS ONE ENTRY FOR EACH REMOTE EMPLOYEE WHO HAS BEEN SENT THE ABE TOOL. |
| 74 — ETHERNET MIGRATION MANAGER BILLING AND REPORTING (EMM BAR) DATABASE | A LOTUS DOMINO DATABASE WHICH CONTAINS IN ONE PLACE ALL INFORMATION FROM ALL ENTERPRISE INSTANCES OF EMM. |
| 76 — ETHERNET MIGRATION MANAGER REPORT REPOSITORY (EMM RR) DATABASE | A LOTUS DOMINO DATABASE WHICH CONTAINS ALL BILLING REPORTS AND SNAPSHOT DATAPOINTS TO SUPPORT DELTA BILLING PROCESS. |
| 80 — EMM INSTANCE MANAGER (EMM IM) DATABASE | A LOTUS DOMINO DATABASE WHICH CONTAINS ONE ENTRY FOR EACH ENTERPRISE INSTANCE OF EMM. INSTANCE STATUS, GEOGRAPHY, ETC. INFORMATION IS MANAGED HERE. |
| 82 — EMM DOCUMENTATION AND RULES (EMM DR) DATABASE | A LOTUS DOMINO DATABASE WHICH CONTAINS DOCUMENTATION AND CONFIGURABLE RULES COMMON TO ALL INSTANCES OF EMM. IT IS USED TO AUTOMATICALLY DISTRIBUTE UPDATES OF THIS INFORMATION TO ALL INSTANCES. |
| 84 — EMM AGENT CONTROL (EMM AC) DATABASE | A LOTUS DOMINO DATABASE WHICH CONTAINS ONE ENTRY FOR EACH ENTERPRISE INSTANCE OF EMM. A SERIES OF DATA PROCESSING AGENTS MAY BE ENABLED/DISABLED FOR ALL ENTERPRISE INSTANCES. THIS DATABASE ALSO CONTAINS THE DATA PROCESSING AGENT SCHEDULING AND PERFORMS THE ACTUAL AGENT EXECUTIONS. |
| 86 — CLIENT INFOMATION REPOSITORY (INFO.NSF) DATABASE | A LOTUS DOMINO DATABASE WHICH CONTAINS CENTRALIZED EMPLOYEE ORGANIZATIONAL AND LOCATION INFOMATION FOR EFFICIENT USE BY OTHER TOOLSUITE COMPONENTS. |

FIG. 6

→ DROP DOWN SELECTABLE CHOICES AND FIELD REQUIREMENTS DEFINED IN LOCAL SITE INITIALIZATION FILE (.ini file)

THE EMPLOYEE SERIAL NUMBER OR LAST NAME AND TIE-LINE USED TO PULL INFO FROM BLUEPAGES.

**THE TOOLS ATTEMPTS TO LOCATE ALL INFO ON THIS SCREEN ON ITS OWN. IF IT CANNOT YOU MUST ENTER IT MANUALLY

LOCATION INFORMATION PULL DOWNS ARE DEFINED IN SITE .ini file

MOVERS REQUIRED IS USED AS A "flag." IT WILL PUT THIS RECORD IN A VIEW CALLED MOVERS REQUIRED IN THE DB.

YOU MUST VERIFY EACH NETWORK CARD IN THE LIST. SELECT THE CARD NAME AND PRESS 'Edit'.

EMMIT Machine Data (V2.0.2)

Owner/User
***Serial: 2A6747    Unknown         Look Up
*Last Name: Locke              Tie: 532-8570

Location Information
*Site: East Fishkill    *Movers Required: ○ Yes ⊙ No
*Building: 3300   *Floor: 2     Office 2BDE2B-49

Machine Information
*Mfg.: IBM          *Serial: 78CGRG5      Unknown
*Type: 2652
*Model: D3U         *OS: Windows 2000
Type N/A  Model N/A  *Version: C4EB 1.1.006 AM Fix Level 00

Network Cards or Drivers Found
Vfy Sup Port ID    Card Name
Yes               Intel(R) PRO/100 VE Network Connection
No                Symbol LA-41x1 Spectrum24 Wireless LAN PC Card — 126
                  Recommended Adapter — 128

Add   Edit   Remove
<Previous   Next>   Prefill   Cancel

FIG. 8

EMMIT Networking Information (V1.7.2)

*Card Name: Intel(R) PRO/100 VE Network Connection
*Verify Card Exists: ●Yes ○No ○Unknown
*Cable ID: 12345    Can not read port ID
*Static Address Required: ○Yes ●No
Static Address Justification:
Host Name: vicky1
Address: 0.0.0.0
Is there a splitter on this port: ○Yes ●No OK    Cancel

— 132

YOU MUST VERIFY WETHER OR NOT THE CARD IS IN THE MACHINE. VERIFY THE CARD BY CHOOSING YES OR NO

ENTER THE LAN JACK NUMBER. IF IT IS BLOCKED PRESS THE BUTTON "Cannot read port ID"

IF A STATIC ADDRESS IS REQUIRED SELECT 'Yes' AND CHOOSE A JUSTIFICATION FROM THE DROP-DOWN

IF THERE IS A SPLITTER ON THE PORT CHOOSE YES. THERE IS A VIEW IN THE DB THAT WILL SHOW THESE RECORDS.

FIG. 9

YOU MUST NOW CHOOSE THE TYPE OF MIGRATION:

INVENTORY ONLY- NO MIGRATION IS BEING DONE AT THIS TIME
(IF THIS CHOSEN YOU WILL GO DIRECTLY TO THE LAST SCREEN ASKING
YOU TO SEND THE DATA OR SAVE IT.)

SELF INSTALL- THE USER WILL DO THE INSTALL ON THEIR OWN

SHOPPING CART INSTALL- DSR HAS THE ADAPTER REQUIRED AND WILL DO
THE MIGRATION AT THIS TIME

NOT TO BE MIGRATED- THIS MACHINE WILL NOT BE MIGRATED TO ETHERNET
AT ALL.

ADAPTER JUST INSTALLED: IF THERE WAS A RECOMMENDED ADAPTER
THAT APPEARED IN THE PREVIOUS SCREEN AND WAS VERIFIED AS BEING IN
THE MACHINE THIS OPTION WILL APPEAR.
CHOOSE:
  YES- IF YOU JUST INSTALLED THIS CARD FOR THE CLIENT, THIS WILL BE THE
       ADAPTER THAT APPEARS IN THE 'Adapter Installed' FIELD.
  NO- IF THIS CARD WAS ALREADY IN THE MACHINE. (THE MACHINE DID
      NOT NEED A CARD TO BE INSTALLED WHICH= NONE REQUIRED AS
      THE 'Adapter Installed')

```
┌─────────────────────────────────────────────────────┐
│ EMMIT Migration Type (V2.0.2)                    ☒  │──134
│ ┌─Migration Type─────────────────────────────────┐  │
│ │ Choose the type of migration desired           │  │
│ │   ○ Inventory Only                             │  │
│ │   ○ Self Install                               │  │
│ │   ⦿ Shopping Call Install                      │  │
│ │   ○ Not to be migrated                         │  │
│ └────────────────────────────────────────────────┘  │
│ ┌─Adapter Just Installed─────────────────────────┐  │
│ │ Was the supported adapter that you verified installed during this visit? │──140
│ │   ○ Yes  ⦿ No                                  │  │
│ └────────────────────────────────────────────────┘  │
│                                                     │
│  <Previous>           <Next>          [Cancel]      │
└─────────────────────────────────────────────────────┘
```

FIG. 10

INSTALLER:
FOR SELF INSTALL
    GS INSTALLER = NO
    UNLESS, YOU MANUALLY CHANGE IT TO YES.

MIGRATION:
IN THIS CASE THE RECORD IS COMPLETE BECAUSE THERE IS A CARD IN THE MACHINE
OTHERWISE, IF COMPLETE CHOOSE YES, IF IT IS NOT CHOOSE NO.
THE SCHEDULED DATE AND TIME DEFAULTS TO THE PRESENT TIME IF NOT COMPLETE YOU CAN CHOOSE A SCHEDULED DATE AND CHOOSE THE REASON WHY IT IS NOT COMPLETE

INSTALLED HARDWARE:
IN THIS CASE THERE WAS NO ADAPTER REQUIRED.
IF AN ADAPTER WAS REQUIRED CHOOSE THE ONE INSTALLED FROM THE DROP DOWN LIST.

CABLES: THE DEFAULT IS 1. IF NO CABLE IS LEFT CHANGE THIS TO 0.

RITs: IF A RIT WAS USED, RECORD THE NUMBER

MDOs: IF AN MDO DEVICE WAS INSTALLED CHOOSE A NUMBER AND THEN CHOOSE THE DEVICE NAME FROM THE LIST.

LABOR: ENTER INVENTORY, INSTALLATION AND ANY OTHER (BREAK/FIX) LABOR.

FIG. 11

INSTALLER:
FOR SHOPPING CART, GS INSTALLER = YES

CHOOSE THE INSTALLERS NAME FROM THE LIST

MIGRATION:
IN COMPLETE CHOOSE YES, IF IT IS NOT CHOOSE NO.
THE SCHEDULED DATE AND TIME DEFAULTS TO THE PRESENT TIME

IF NOT COMPLETE, YOU MUST CHOOSE THE REASON WHY

INSTALLED HARDWARE:
IN THIS CASE THERE WAS NO ADAPTER REQUIRED. THERE WAS ALREADY A SUPPORTED CARD IN THE MACHINE.

IF AN ADAPTER WAS REQUIRED CHOOSE THE ONE INSTALLED FROM THE DROP DOWN LIST.

THE RECOMMENDED ADAPTER APPEARS NEXT TO THE ADAPTER FIELD

CABLES: THE DEFAULT IS 1. IF NO CABLE IS LEFT CHANGE THIS TO 0.

RITs: IF A RIT WAS USED, CHANGE TO 1

MDOs: IF AN MDO DEVICE WAS INSTALLED CHOOSE A NUMBER AND THEN CHOOSE THE DEVICE NAME FROM THE LIST.

LABOR: ENTER INVENTORY, INSTALLATION AND ANY OTHER (BREAK/FIX) LABOR.

FIG. 12

EXAMPLE 2 (MACHINE NEEDS AN ETHERNET CARD)

INSTALLED HARDWARE:
ADAPTERS = 1 (THIS IS THE DEFAULT)
IN THIS CASE, THE MACHINE BEING MIGRATED NEEDS A CARD. THE 06P4004 IS THE RECOMMENDED CARD AND APPEARS IN THE ADAPTER TO ORDER FIELD.

THE RECOMMENDED ADAPTER APPEARS NEXT TO THE ADAPTER FIELD

IF THIS CARD WAS SUPPLIED BY THE CUSTOMER CHANGE THIS FIELD TO YES. PLEASE NOTE THAT THE CUSTOMER WILL NOT BE CHARGED.

FIG. 13

IF NOT TO BE MIGRATED IS CHOSEN THE NO MIGRATION SCREEN WILL APPEAR NEXT

MIGRATION:
CHOOSE A REASON FOR NO MIGRATION

IF TOKEN RING EXCEPTION IS CHOSEN YOU WILL HAVE THE OPPORTUNITY TO ENTER A TARGET DATE FOR CONVERSION.

ENTER INVENTORY LABOR

EMMIT No Migration Data (V2.0.2)

Migration
Reason For No Migration [Employee Leaving Location]
Target Date [2/14/2003]

Justification

Labor
Inventory Hours [0] [+][-]  Minutes [10] [+][-]

Comments

[<Previous]  [Next>]  [Cancel]

FIG. 14

ENTER THE SERIAL NUMBER OR LAST NAME AND TIE-LINE
AND LOCATION INFO

EMMIT Machine Not Available (V2.0.2) — 180

Owner/User
***Serial: 2AG747    [Look Up] — 182
*Last Name: Locke  Tie: 532-8570

Location Information — 184
*Site: East Fishkill   *Movers Required: ○ Yes ⊙ No
*Building: 3300  *Floor: 2   Office: 2BDE28-49

Note:
This machine class identifies this employee even though a machine is not available for inventory.
A "sorry we missed you" note should either be left in this office or mailed to the employee from EMM.
If an inventory can be run on the machine, use the Previous button and choose a different machine class.
The data collected for this machine class is placed in a special view in EMM that can be used as a list to track follow up so that the actual inventory or migration can be done on the machine in the future.

[<Previous]  [Next>]                              [Cancel]

THERE ARE FOUR INVENTORY FILE OPTIONS ON THE FINAL SCREEN

IF YOU WANT TO SEND DATA THAT HAS BEEN SAVED LOCALLY, EXECUTE THE TOOL AGAIN AND IT WILL ASK YOU IF YOU WANT TO SEND DATA THAT IS SAVED

FIG. 16

SPECIAL NEEDS:

THE SPECIAL NEEDS SCREEN IS OPTIONAL.
THE ini file DETERMINES THE CHOICES ON THIS SCREEN
IF YOU WOULD LIKE THIS SCREEN FOR YOUR SITE PLEASE CONTACT
EMM SUPPORT.

190

EMMIT Special Needs (V1,2,0)
Needs
☐ SMA
☐ NetBEUI
☐ NetBIOS/NetBEUI
☐ UDP Forwarding
☐ IPX
☐ Apple Talk
☐ RIP
☐ DSPF
☐ VMware + Multiple MACs
☐ Other + describe in comments Comments <Previous    Next >    Cancel

FIG. 17

- INVENTORY DATA COLLECTED VIA EMMIT; DATA PULLED INTO EMM DATABASE
  - 2.0 PORT
    - ALL PORTS TO BE MIGRATED
  - 3.0 MACHINE
    - PHYSICAL INVENTORY: ALL NETWORK CONNECTED DEVICES: PC, RISC, NETWORK PRINTERS, ETC.
  - 4.0 ADAPTER
    - ADAPTER DEMAND FORECASTING AND ORDERING
    - COST ACCOUNTING - DISTRIBUTION OF CHARGES TO CUSTOMERS BASED ON MIGRATIONS
  - 5.0 NETWORK
    - ASSIGNMENT OF TCPIP ADDRESSES
    - RECORDING OF PORTS USED FOR EACH SYSTEM
    - NETWORK TEAM CAN SEE WHEN PEOPLE ARE SCHEDULED
  - 6.0 SCHEDULING
    - MIGRATION SCHEDULING
    - WORK ORDER PREPARATION FOR INSTALLERS
    - WORK COMPLETION RECORD
    - PROJECT TRACKING AND STATUS REPORTING
    - COST ACCOUNTING- DISTRIBUTION OF DESKSIDE CHARGES TO CUSTOMERS BASED ON WS POPULATION (USE FOR INPUT TO ManageNow)
  - 9.0 GENERAL
    - INSTALL TEAM SUMMARIES (FOR TIME)

METHOD AND SYSTEM FOR ENTERPRISE-WIDE MIGRATION

CROSS REFERENCE TO RELATED APPLICATION

This application is a divisional application of copending application Ser. No. 11/186,211, filed Jul. 21, 2005, which is a continuation-in-part of copending application Ser. No. 10/728,520, filed Dec. 4, 2003.

BACKGROUND OF THE INVENTION

1. Field of the Invention

This invention generally relates to managing and effecting an enterprise-wide technology migration, and more specifically, to an integrated set of tools and processes to manage an enterprise-wide information technology migration.

2. Background Art

Many corporations and other enterprises have very extensive information technology or telecommunications systems or networks. These systems may include personal computers, workstations, servers, printers, monitors, data storage facilities, as well as the many software applications used on these devices and all the wiring, cabling and connectors needed to interconnect the system or network components.

From time to time, it is necessary or desirable to make extensive or fundamental changes in or to these networks or systems. For instance, an enterprise may want to migrate from one basic type of network to another. Examples of such migration include: Token-ring to Ethernet; Windows to LINUX; Dell PCs to IBM PCs; Microsoft Exchange/Outlook to Lotus Notes; and phone system migrations.

These migrations, because of the large number of pieces of equipment involved, the disparate nature of these pieces of equipment, and the complex relationships between the equipment, can be very difficult, complicated and expensive to manage. There does not exist in the prior art a configurable, integrated and end-to-end set of processes and corresponding electronic toolsuite to manage effectively large scale enterprise-wide information technology-related or telecommunications-related migrations.

A number of specific challenges may be faced in the course of a large scale, enterprise-wide migration. For example, when preparing for a large migration of any type, the first step is to see what the status of the existing machine is. Because of the large number of and very diverse nature of those machines, it may be difficult to provide a manageable process and tool to do this.

Another challenge is that, whenever a large migration project is done, there are always targeted users that do not get completed during the planned window. There can be many reasons for this, including users on vacations, or otherwise not available during the migration window. Processes and tools need to be provided that allow a user to collect the desired inventory data outside of the window of time when the other inventory methods are being used.

In addition, during a large migration project, data is collected about each client. Each logical group of clients often has custom requirements. For instance, clients in Canada may not use the RIT connectors or need to mail card and cables. While a new tool could be developed for each of these logical groups of clients, this is a time consuming and cumbersome task. It is much more desirable to provide a single, configurable tool that can be customized for each of these logical groups of users.

In accordance with a second aspect of the invention, a method, system and computer program are provided for customizing an inventory data collection tool for a plurality of logical groups of users. The method comprises the steps of providing an inventory data collection tool, providing a common control file to customize the tool for each of said logical groups of users, and providing each of the logical groups of users with a copy of the inventory data collection tool and with a first copy of said common control file. Each of the groups of users uses said first copy of the common control file to customize the tool for said each of the groups of users.

In a preferred implementation of this aspect of the invention, a copy of the common control file is stored on a server that copy of the common control file on the server is updated, and each of the logical groups of users is provided with access to the copy of the common control file on the server. In this way, each of the logical groups of users has the option of using either the copy of the common control file on the server, or the first copy of the common control file provided to said each of the logical groups of users with the tool.

SUMMARY OF THE INVENTION

An object of this invention is to provide a comprehensive and integrated set of processes and tools to manage large-scale information-related migrations.

Another object of the invention is to provide a configurable, integrated and end-to-end set of processes and corresponding electronic toolsuite to manage effectively large-scale enterprise wide information technology-related or telecommunications related migrations.

An object of this invention is to provide an improved procedure and tool for collecting machine information for a large scale equipment migration.

Another object of the invention is to provide a desk side representative with an improved, flexible and configurable tool for collecting inventory data needed for a large scale equipment migration.

A further object of the present invention is to provide a control file for an inventory data allocation tool that enables users to customize the information gathering per each logical group of users.

Another object of the invention is to locate an improved common control file for an inventory data collection tool on a central server, and to enable each of a plurality of users of the tool to download the control file in order to customize the tool for their own use.

An object of this invention is to download an inventory data collection tool over a network, such as the Internet, to a computer.

Another object of the invention is to enable a client computer of a network to process an inventory data file generated by another computer of the network.

These and other objectives are attained with a method of and system for enterprise-wide migration. The method comprises the steps of creating instances of databases for a migration, for billing and reporting, and repositing reports; gathering information on the organization, location, hardware, and software affected by said migration into a database for planning said migration; and building an inventory of the affected hardware and software using an inventory tracking tool or an inventory mailer.

Migration hardware and software is ordered based on said planning and said inventory, using an inventory tool; and labor, hardware, and software as installed are tracked and billed, using said billing and reporting database. Agents for said creating, gathering, building and tracking are enabled using an agent control facility.

In a preferred embodiment, the database for planning includes one entry for each device affected by the migration, and the built inventory is transmitted into the database for planning. Also, preferably, the agent control facility includes an agent control database, and this database performs the agent executions.

In accordance with one aspect of the invention, a method, system and computer program are provided for collecting inventory data about a group of machines at an office. This method comprises the steps of running an inventory tool on each of said machines, and the tool presenting dialogue displays on each of the machines. The method comprises the further steps of filling in or changing data in the dialogues presented by the tool; and submitting the collected information to a server.

In a preferred embodiment, the machine is physically migrated if the needed hardware/software is available. Also, in the preferred embodiment, a desk side representative visits the office, runs said inventory tool on each of said machines, and fills in or changes data in the dialogue presented by the tool. As an alternative, the tool may be downloaded to the physical group of users over a network such as the Internet.

In accordance with another aspect of the invention, a system is provided for collecting inventory data about a group of machines at an office. This system comprises an inventory tool; means to run said inventory tool on said machines, wherein said tool presents dialogue displays on each of the machines; means for filling in or changing data in the dialogues presented by the tool; and means for submitting the collected information to a server.

Preferably, this system further comprises, for each of said machines, means for physically migrating the machine. Also, preferably, a desk side representative visits the office, and said desk side representative operates said means for running said inventory tool on each of said machines. Also, preferably, the desk side representative operates said means for filling in or changing data in the dialogue presented by the tool. With one embodiment, inventory tool is downloaded over a network to at least one of the machines of said group. With another embodiment, a desk side representative visits the office and brings the inventory tool to said office.

In accordance with another aspect of the invention, a system is provided for customizing an inventory data collection tool for a plurality of logical groups of users. This system comprises an inventory data collection tool; a common control file to customize the tool for each of said logical groups of users; and means for providing each of the logical groups of users with a copy of the inventory data collection tool and with a first copy of said common control file; and wherein each of the groups of users uses said first copy of the common control file to customize the tool for said each of the groups of users.

Preferably, a copy of the common control file is stored on a server, and the system further comprises means for updating the copy of the common control file on the server; and means for providing each of the logical groups of users with access to the copy of the common control file on the server; and wherein each of the logical groups of users has the option of using either the copy of the common control file on the server, or the first copy of the common control file provided to said each of the logical groups of users with the tool.

Preferably, said first copy of the common control file includes means to warn one of said users that the said one of the users is using said first copy of the common control file. Also, preferably, the means to warn includes means to warn said one of said users that said one of the users is not using said copy of the common control file from said server. With one embodiment, each of the logical groups of users is given the inventory data collection tool with said first copy of said common control file already on the inventory data collection tool. With another embodiment, said inventory data collection tool is downloaded over a network to at least one of said each of the logical groups of users.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 is a flow chart showing an embodiment of the invention.

FIG. 2 is a table listing a number of processes that may be used in the practice of this invention, and for each of these processes, one or more toolsuite components or databases, with a representative implementation noted, that may be used to carry out the process.

FIG. 3 is a table that describes in greater detail the toolsuite components and databases listed in FIG. 2.

FIG. 6 illustrates a screen used to obtain additional basic inventory data.

FIG. 8 shows a screen that may be used to collect information about cards on a computer being inventoried.

FIG. 9 illustrates a screen used to identify a type of equipment migration.

FIG. 10 shows a screen that is a dialogue box relating to the equipment migration.

FIG. 11 illustrates a screen that can be displayed when a "Shopping Cart" type of migration is selected.

FIG. 12 shows a screen that may be used if an adapter is being installed.

FIG. 13 shows a screen that may be displayed if a computer is not being migrated.

FIG. 14 shows a screen used to input data if the computer user is not available.

FIG. 16 illustrates a screen that gives a list of special needs that a particular machine may have.

FIG. 17 identifies inventory data that may be collected using the present invention.

DETAILED DESCRIPTION OF THE PREFERRED EMBODIMENTS

Figure 4:
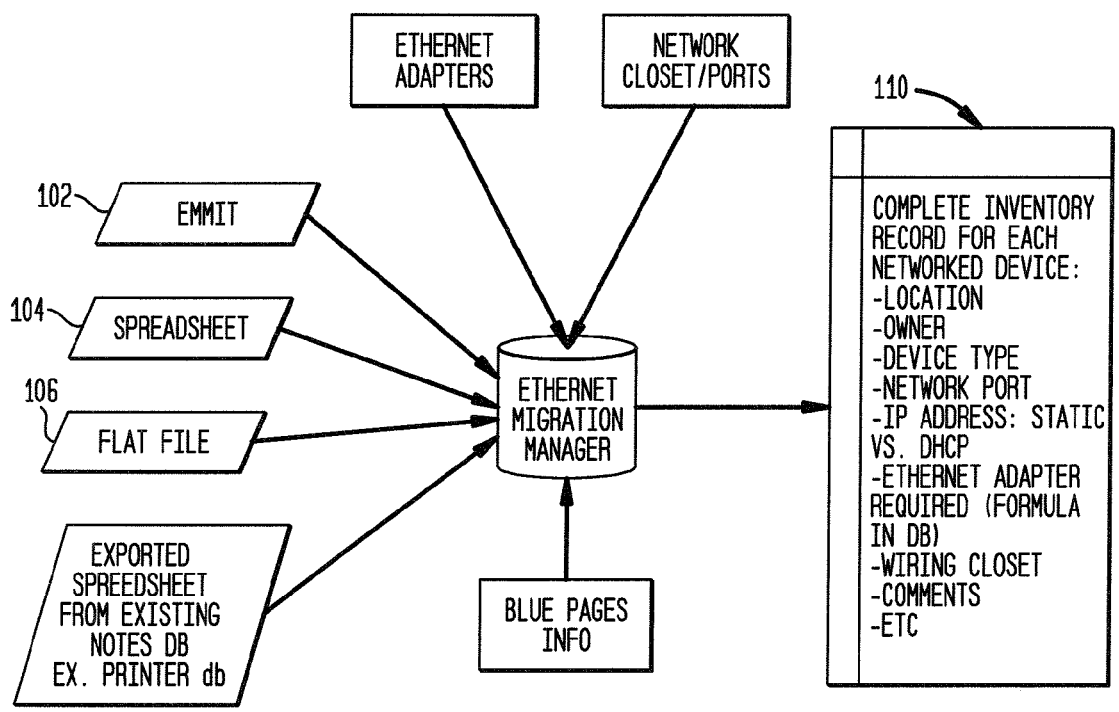
FIG. 4 shows a number of services that may be used to provide inventory data.

As previously mentioned, many enterprises have very extensive information technology or telecommunications systems or networks, and a system or network migration can be expensive, time-consuming and difficult to effect and manage. The present invention provides a configurable, integrated and end-to-end set of processes and corresponding toolsuite to manage effectively a large-scale enterprise wide information technology-related or telecommunications related migration.

FIG. 1 shows a preferred method 10 for implementing this invention. At step 12, instances of databases are created for the migration; and these databases may be used for billing and reporting, and repositing reports. At step 14, information is gathered on the organization, location, hardware and software affected by the migration, and this information is gathered into a database for purposes of planning the migration. Next, at step 16, an inventory is built of the affected hardware and software using an inventory tracking tool or an inventory mailer.

At step 20, migration hardware and software is ordered based on the above-mentioned planning and inventory, using an inventory tool. Step 22 of this method is to track and bill for labor, hardware and software as installed, using the billing and reporting database. As represented by step 24, agents are used for the creating, gathering, building and tracking, and these agents are enabled using an agent control facility.

FIG. 2 identifies processes that may be used in a specific example of the present invention. The discussion given below uses a corporate Ethernet Migration toolsuite and processes as the example of the invention.

FIG. 2 identifies ten specific processes: Workload planning 32; Machine/client inventory information gathering 34; Customer contact management 36; Deployable component inventory control and forecasting 40; Labor tracking and billing 42; Deployable component tracking and billing 44; Project reporting and measurements 46; Database instance creations management and configuration 50; Centralized data processing agent execution 52; and Client information organizational and location information 54. Each of these processes is discussed in more detail below.

Workload planning 32 includes creating an instance of a database for the enterprise. As indicated in FIG. 2, this may be done using the Ethernet Migration Manager (EMM) database.

Machine/client inventory information 34 may include, for example, information about the number, make and models of the computers and printers in the system, and this information can be collected in a number of ways. The information can be obtained by the customer, or by the service provider. Also, in some cases, the customer or the service provider may already have this information, in which case, the data can be directly imported into the database used for the migration. As represented in FIG. 2, this information can be gathered using the Ethernet Migration Manager Inventory Tool (EMMIT), the Mobile Ethernet Migration Manager Inventory Tool (Mobile EMMT), and the Adapter By Exception (ABE) tool.

The third process, customer contact management 36, shown in FIG. 2 is used to keep track of contact between the customer and the service provider. Any suitable tool or tools may be used to implement this process. For example, as indicated in FIG. 2, this process may be implemented using the Ethernet Migration Manager Inventory Tool Mailer (EMMIT Mailer) database, and the Adapter By Exception Mailer (ABE Mailer) database.

The Deployable component inventory control and forecasting process 40 is done to determine the hardware that needs to be ordered for the customer. This hardware may include, for example, adapters, patch-cables, RIT connectors, and MDO devices. This process may be performed using the Ethernet Migration Manager (EMM) database.

Throughout the migration process, it is necessary to keep track of the labor that was done and to bill for this labor. Process 42, Labor tracking and billing, does this. Specifically, this process may be performed using the Ethernet Migration Manager (EMM) database, and the Ethernet Migration Manager Billing and Reporting (EMM BAR) database.

The next process 44, Deployable component tracking and billing, listed in FIG. 2, is used to keep track of and to bill for the hardware components that are installed in the customer system. Any suitable tools may be used for this purpose. For instance, as shown in FIG. 2, these tools may include the Ethernet Migration Manager (EMM) database, the Ethernet Migration Manager Billing and Reporting (EMM BAR) database, and the Ethernet Migration Manager Report Repository (EMM RR) database.

Throughout the whole migration process, reports are prepared and kept track of, and the Project reporting and measurement process 46 is used to do this. In particular, FIG. 2 lists three databases that may be used in this process, including the Ethernet Migration Manager (EMM) database, the Ethernet Migration Manager Billing and Reporting (EMM BAR) database, and the Ethernet Migration Manager Report Repository (EMM RR) database.

The next process 50, Database instance creation, management and configuration, is used to manage the overall migration. In particular, this process is used to identify new instances, manage the instance database and to create new databases. Two specific databases may be used for this purpose: the EMM Instance Manager (EMM IM) database, and the EMM Documentation and Rules (EMM DR) database. This latter database is used to maintain all the pertinent data in one place.

The Centralized data processing agent execution process 52 is provided to manage all the agent programs that are used to run the instances utilized in the migration. The EMM agent control (EMM AC) database may be used for this purpose.

The tenth process listed in FIG. 2 is Client information organizational and location information 54. This process may be used to maintain information about, for example, the customer's employees. Preferably, all of this information is kept in one database, the Client Information Repository (INFO NSF) database.

FIG. 3 is a table that gives more information about the specific databases and tools referred to in FIG. 2. With reference to FIG. 3, the Ethernet Migration Manager (EMM) database 60 is a Lotus Domino database which contains one entry for each client and/or machine and/or device being affected by the migration. Each entry contains information about the owner, location, migration status, labor required, components(s) delivered, etc. The Ethernet Migration Manager Inventory Tool (EMMIT) 62 is a Windows executable, which gathers information about a client and/or machine and/or device and transmits this information to EMM. The Mobile Ethernet Migration Manager Inventory Tool (Mobile EMMIT) 64 also is a Windows executable (mailable to remote employees), which gathers information about a client and/or machine and/or device and transits this information to the EMMIT Mailer.

The Ethernet Migration Manager Inventory Tool Mailer (EMMIT Mailer) database 66 is a Lotus Domino database which contains one entry for each remote employee who has been sent the EMMIT Mailer tool. The Adapter By Exception (ABE) tool 70 is a Windows executable (mailable to employees requiring migration upon demand) which gathers information about a client and/or machine and/or device and transmits this information to EMM. The Adapter By Exception mailer (ABE Mailer) database 72 is a Lotus Domino database which contains one entry for each remote employee who has been sent the ABE tool.

The Ethernet Migration Manager Billing and Reporting (EMM BAR) database 74 is a Lotus Domino database which contains in one place all information from all enterprise instances of EMM. The Ethernet Migration Manager Report Repository (EMM RR) database 76 is another Lotus Domino database which contains all billing reports and snapshot data points to support delta billing process. The EMM Instance Manager (EMM IM) database 80 is a Lotus Domino database which contains one entry for each enterprise instance of EMM. Instance status, geography, etc., information is managed in this database.

The EMM Documentation and Rules (EMM DR) database 82 is a Lotus Domino database which contains documentation and configurable rules common to all instances of EMM. It is used to automatically distribute updates of this information to all instances. The EMM Agent Control (EMM AC) database 84 is another Lotus Domino database which contains one entry for each enterprise instance of EMM. A series of data processing agents may be enabled/disabled for all enterprise instances. This database also contains the data processing agent scheduling and performs the actual agent executions. The Client Information Repository (INFO.NSF) database 86 is a Lotus Domino database, which contains centralized employee organizational and location information for efficient use by other toolsuite components.

In accordance with one aspect of the invention, a procedure and tool are provided for collecting machine information for a large scale migration by desk side representatives (DSR). Generally, in this aspect of the invention, a DSR visits each workstation and runs a tool that collects required data about the workstation and sends it back to a collection server. If the tool cannot be run on the workstation, then it can be run on some other workstation and the data can be entered manually to complete the inventory.

More specifically, the preferred embodiment of this aspect of the invention comprises the following steps:

1. DSR visits an office;
2. Run the EMM IT tool on the machine;
3. Fill in or change the data in the dialogs presented by the tool;
4. Physically migrate the machine if the needed hardware/software is available; and
5. Submit the collected information to the server.

FIGS. 4-17 illustrate this aspect of the invention. As shown in FIG. 4, a number of sources can be used to provide the necessary or desired inventory data to the migration manager. For instance, inventory tool 102 may be used, a spreadsheet 104 may be used, or a flat file 106 may be used. FIG. 4 also shows a desired inventory record 110. As indicated therein, this record may include, for each network device, the location, owner, device type, network port, IP address, whether the IP address is static or DHCP, the required adapter, and the wiring closet; and preferably, the inventory record also provides an area or space for comments. As will be understood by those of ordinary skill in the art, the record may include more or less information than as shown in FIG. 4.

Preferably, the inventory tool 102 is designed to run on any Windows Client, and is designed to run a network connected or stand-alone windows system to collect inventory and network information. Also, the inventory tool, preferably, includes an INI file that controls all of the configurable features for the pull down menus in each screen, and the tool provides input checking. For example, the inventory tool may be designed so that if data entered does not match a template, an error message is displayed.

Figure 5:
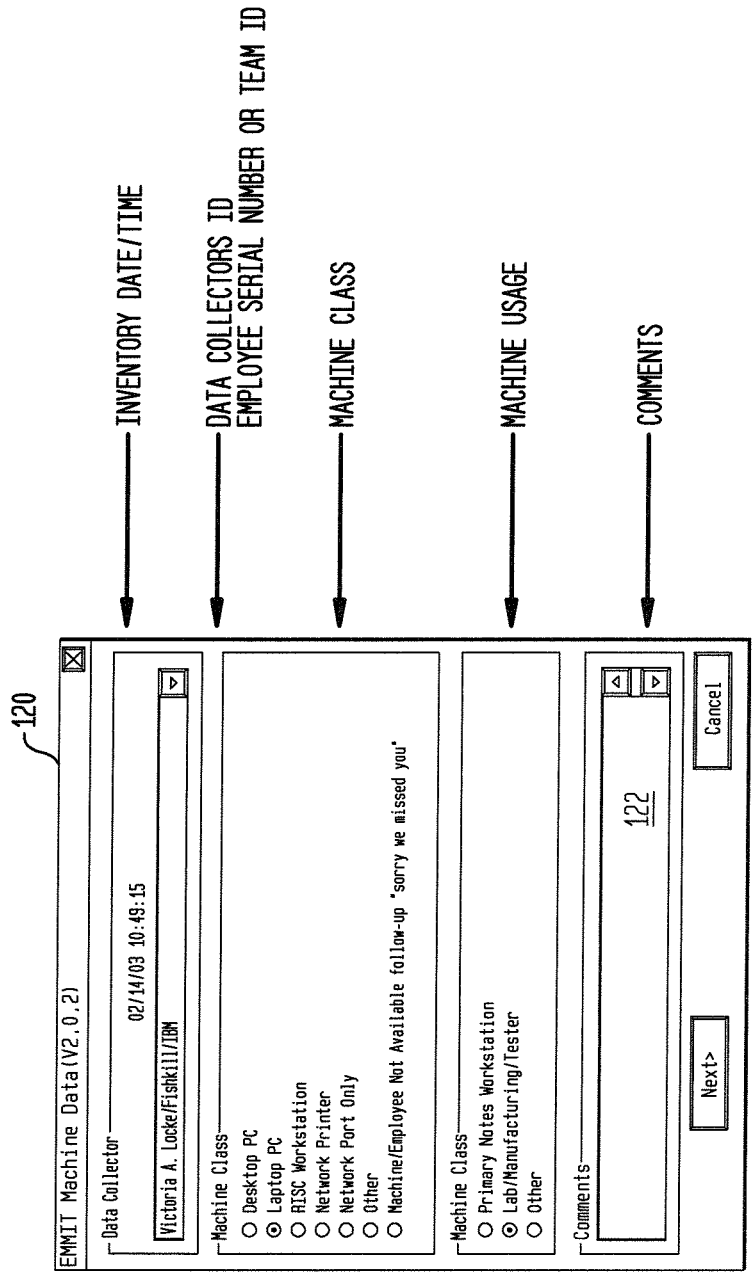
FIG. 5 shows a screen that may be used, in the present invention, to obtain.

FIG. 5 shows a screen 120 used to obtain basic data such as the inventory data and time, the data collector's ID, the machine class, and machine usage. This screen also includes an area 122 for comments.

FIG. 6 shows a screen 124 with additional basic information. For example, this screen provides the name and identification information about the workstation user, information about the location of the workstation, and other information about the workstation. Preferably, this other information also includes a list 126 of the network cards on the computer. Also, preferably, most or all of this information is pre-filled, with the data collector having the option to change the data.

Figure 7:
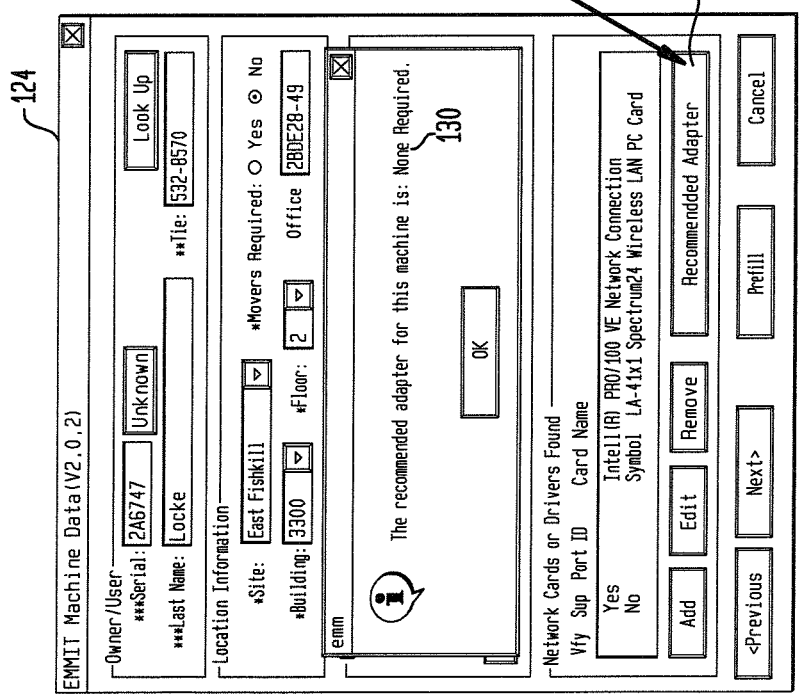
FIG. 7 shows the screen of FIG. 6, with a "Recommended Adapter" field.

The screen of FIG. 6 can also be used to let the computer user know what the recommended adapter is. Tool 102 includes a routine to map the computer configuration, including data identified in the previous screen to a recommended adapter. With reference to FIGS. 6 and 7 when the "recommended adapter" button 128 shown in the lower right of the screen is pushed, the screen then identifies that recommended adapter. If the machine configuration does not map to an adapter, then the screen can display "Unknown" or if the machine configuration does not require an add on network card the screen can display "None Required" as shown in FIG. 7 at 130.

The screen 132 of FIG. 8 is used to show more information abut the cards on the machine, and a respective one screen may be shown for each card listed in the screen of FIG. 6. To complete the screen of FIG. 8, the DSR verifies, among other information, that the card is on the machine and enters a cable ID.

The screen 134 of FIG. 9 is used to identify the type of migration. The DSR has four choices: (1) Inventory Only, (2) Self Install, (3) Shopping Cart Install, and (4) Not to be Migrated. "Inventory Only" means that no migration is being done at this time, and "Self Install" means that the computer user will do the install on their own. "Shopping Cart Install" means that the DSR will do the install immediately, during the visit, and "Not to be Migrated" means that this machine will not be migrated at all.

Preferably, the screen of FIG. 9 is also used to indicate whether an adapter was just installed. If there was a recommended adapter that appeared in the previous screen, and that adapter was verified as being in this machine, this option preferably appears. In the preferred procedure, the DSR indicates "yes" if this card was just installed for the client. This, then, will be the adapter that appears in the "Adapter Installed" field 140. This field indicates "no" if this card was already in the machine. This is the case if the machine did not need a card to be installed.

FIG. 10 shows a screen 142 that is a dialogue box relating to the migration. Fields 144 and 146 are provided to show who is performing the installation and the status of the migration. A subfield is provided to show the scheduled date and time for the migration, and preferably this subfield defaults to the present time. Another field 150 is provided to show the installed hardware, which may include cables, RITs and MDOs. In addition, a field 152 is shown to keep track of the labor time used for the installation.

FIG. 11 shows a screen 154 that can be displayed when the "Shopping Cart" type of migration is selected, and this screen is used to collect data about the migration. A field 156 is provided to indicate whether the migration is complete or not, and another field 160 is provided to show the installed hardware, including cables, RITs and MDOs. A field 162 may also be used to keep track of the labor time for the migration.

FIG. 12 shows a screen 164 that is another version of the screen of FIG. 11 and that may be used if an adapter is being installed. This screen shows the recommended adapter, and includes a field for identifying the actual installed adapter.

If no migration is to occur, the screen 170 of FIG. 13 may be shown. A field 172 is provided to choose a reason for no migration, and a field 174 may be provided to keep track of the amount of time used for the inventory.

FIG. 14 shows a screen 180 used to input data if the computer user is not available. Fields 182 and 184 are provided to identify the user name and other user information, and to identify the location of the machine.

Figure 15:
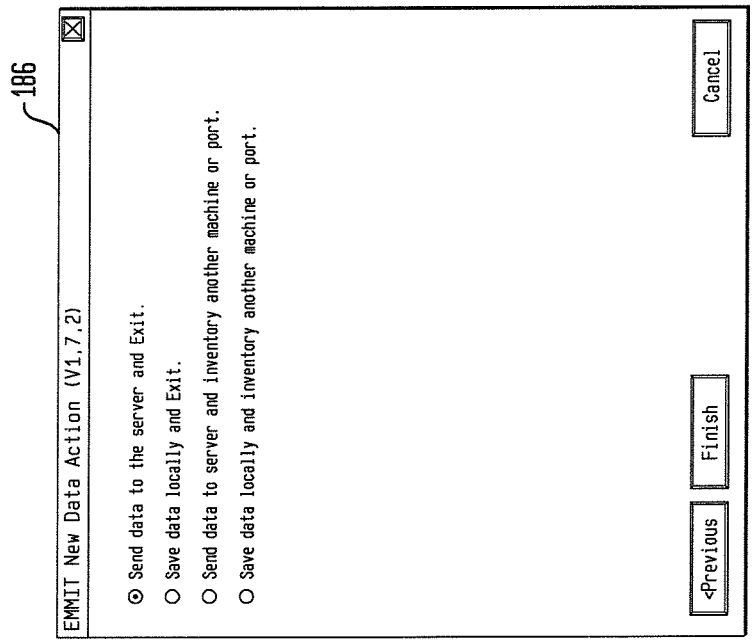
FIG. 15 illustrates a screen that may be used to provide instructions to the inventory tool.

FIG. 15 shows a screen 186 that is used to instruct the tool about what to do with the collected inventory data. As indicated on the screen, the DSR has four options: (1) send the data to the server and exit; (2) save the data locally and exit; (3) send the data to the server and inventory another machine or port; and (4) save the data locally and inventory another machine or port. Preferably, if the data is saved locally and the DSR later wants to send the data to the server, this can be done by executing the tool again. When re-executed, the tool will ask the DSR if they want to send the data that is saved to the server.

Screen 190 of FIG. 16 shows a list of special needs that a particular machine may have. A variety of needs may be shown on this screen, and, in the preferred embodiment, this list is determined by entries in the INI control file used by the inventory tool.

FIG. 17 shows, as an example, inventory data that may be collected using the inventory tool. As shown in this Figure, this data may include information about the ports, the machine, the adapter, the network, scheduling, and other general information.

In accordance with another aspect of this invention, a procedure is provided for downloading inventory data tool 102 over a network such as the Internet. As mentioned above, in a preferred procedure, a Desk Side Representative manually uses the inventory tool to collect the inventory data for the computers of a network. As an alternative, the inventory collection tool can be downloaded to the computers of the network, and each computer can use that tool to collect the desired inventory data about itself. For example, the tool may be stored on a Web site and downloaded there from over the Internet. This alternative procedure may be used if, for instance, one or more of the computers was missed by the DSR—that is, for one reason or another, the DSR did not collect the needed data from one or more of the computers.

Figure 18:
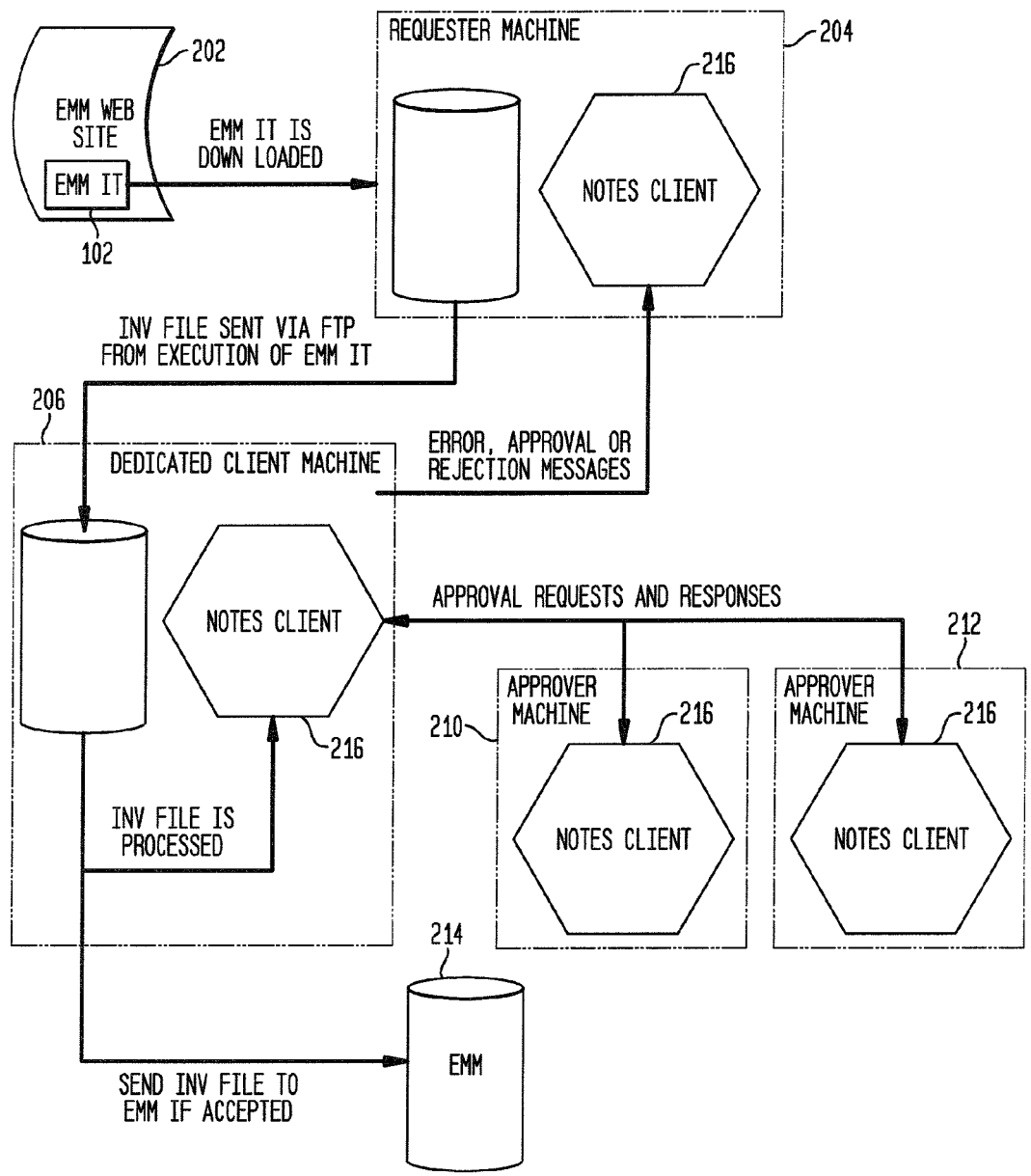
FIG. 18 illustrates a procedure for downloading an inventory tool over a network and for processing an inventory file generated by that tool.

FIGS. 18-21 illustrate this alternate inventory data collection procedure. FIG. 18 provides an overview of the procedure, and FIGS. 19-22 show in more detail various parts of the procedure. Generally, FIG. 18 shows Web site 202, which holds inventory tool 102, a requestor machine 204, a dedicated client machine 206, approver machines 210 and 214, and storage server 214.

In operation, the inventory tool 102 is downloaded from the Web site 202 to a computer 204 that requests the tool, and this computer then executes the tool to generate an inventory (INV) file that is then transmitted to the dedicated client machine 206. This dedicated client machine is a computer on the network that is running software in the Notes Client 216 that enables it to process the INV files sent from the requester machine 204. If the appropriate approval is received from the approver machines, and it is otherwise appropriate to process the INV file, that file is then sent to server 214. This server may be part of Web site 202, or it may be a stand alone server. Also, during the above-described process, messages may be sent, as represented at 216, among machines 204, 206, 210 and 212.

Figure 19:
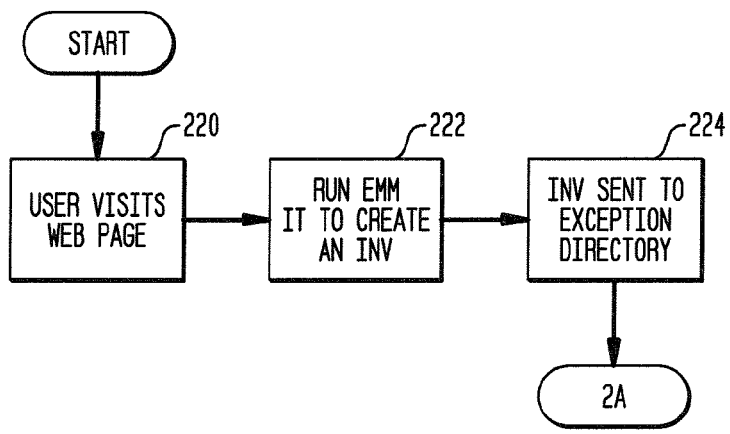
FIG. 19 shows in more detail a first part of the procedure illustrated in FIG. 18.

FIG. 19 illustrates in more detail a first part of this process. More specifically, as represented at 220, at the start of this process, a user visits a Web page at Web site 202 to obtain the inventory tool. That tool is downloaded to requestor machine 204 that, as represented at 222, executes the tool to create an INV file. As represented at 224, when this file is created, it is stored using FTP on the dedicated client machine in a directory, referred to as the exception directory, which is a directory set up for this purpose.

Figure 20:
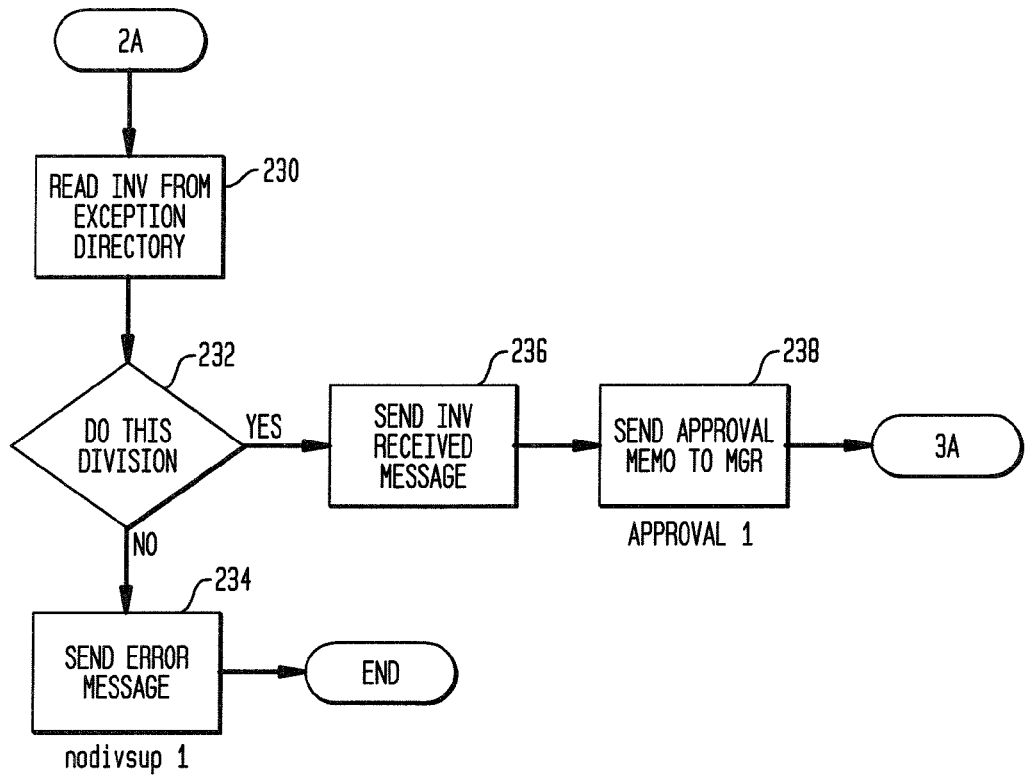
FIG. 20 shows a first part of the role of a dedicated client machine in the procedures of FIG. 18.

FIG. 20 shows in more detail the role of the dedicated client machine 206. At step 230, this machine reads the INV file that was saved by the requestor machine 204. As represented at 232, the dedicated client machine then determines if the INV file is from a machine that belongs to a division that is being migrated. If not, then at 234, an error message is sent back to the requestor machine and the procedure ends. However, if the division is being migrated, the procedure moves on to block 236, where an INV received message is sent back to requestor machine 204. Then, at 238, the client machine 206 sends a first approval request to approver machine 210.

Figure 21:
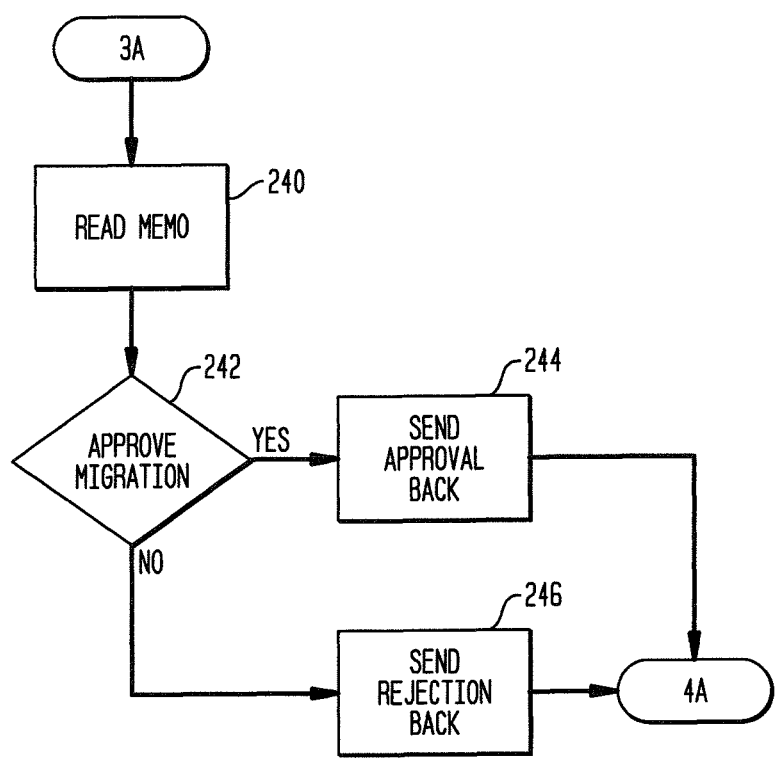
FIG. 21 illustrates an approval process used in the procedure of FIG. 18.

Approver machine 210 follows the sub-procedure of FIG. 21. At 240, the machine reads the request for approval; and at 242, that request is either approved or rejected. In either case, and as represented at 244 and 246, notification of the decision is sent back to the dedicated client machine 206.

Figure 22:
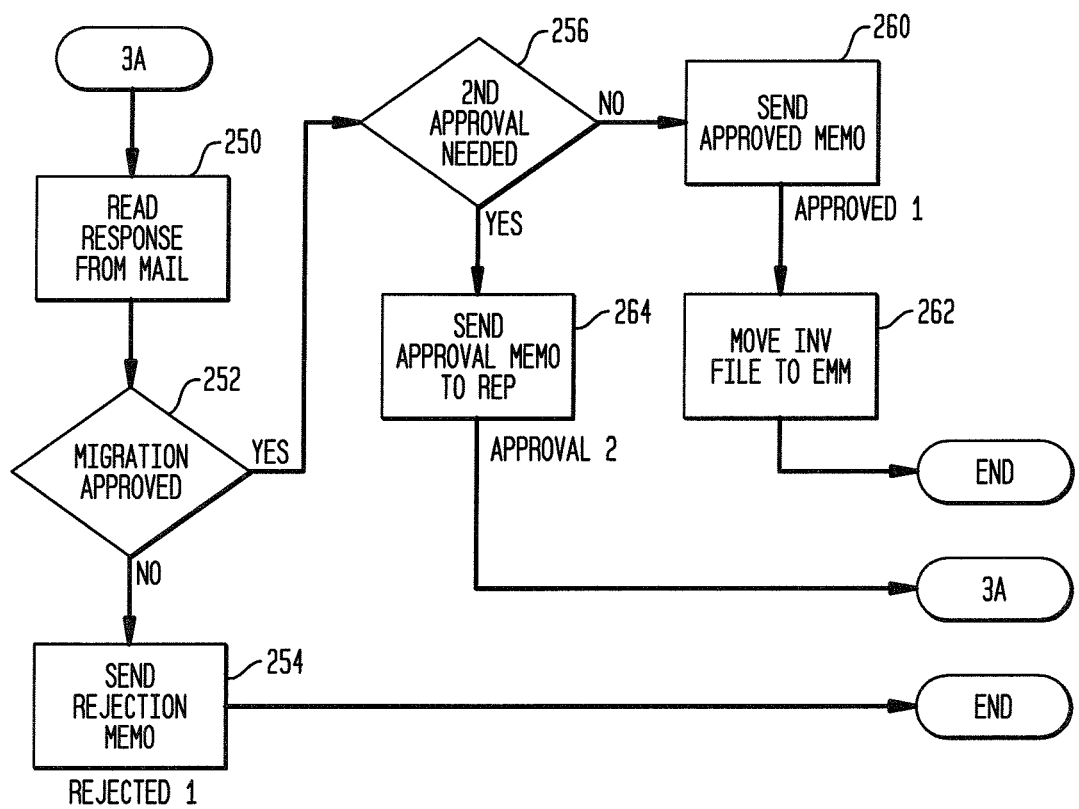
FIG. 22 shows another part of the role of the dedicated client machine in the process of FIG. 18.

The dedicated client machine 206 then proceeds as shown in FIG. 22. At 250 and 252, the machine reads the response from the approver machine 210 and determines whether that response is an approval or a rejection. If the response is a rejection, then at 254, a memo to this effect is sent back to the requestor machine 204, and the procedure ends. If the response is an approval, then at 256, the client machine determines if an additional approval is needed. If not, the client sends, at 260, a memo to this effect to the requestor machine. Then, at 262 the INV file is moved to server 214, and the procedure terminates.

However, if at 256, the dedicated client machine 206 determines that an additional approval is needed, then at 264, a request for approval is sent to second approver machine 212. This machine, following the procedure of FIG. 21, either approves or rejects the request, and sends a response, indicating this decision, back to the dedicated client machine.

Upon receipt of this response, the dedicated client machine again proceeds through the routine of FIG. 22. If the request for approval was denied, a notice to this effect is sent to the requestor machine, and the process ends. If the approval was granted, the dedicated client machine determines whether further approval is needed. If no further approval is needed, the INV file is moved to server 214, and the process ends.

In accordance with a further aspect of the invention, a control file is provided to enable users to customize information gathering per each logical group of users. The data collection tool along with control fields are made available using one of the procedures discussed above or some other procedure. The client or a desk side representative then runs the tool with the appropriate control file. The screens and questions presented to the user are then customized according to the control file so that they are appropriate for that group.

As an example, during an Ethernet migration project, at several locations it may be necessary to collect information about a large number of connections to a host from a workstation. The control file for those locations may include a "Special Needs" section so a client would be presented a list of possible special needs. At other sites, there may be no need to collect this information, so there is no "Special Needs" section included in the control files for those sites. Yet other sites may use the "Special Needs" section to collect other location specific data.

An example of a suitable control file is shown in the attached Appendix. This control file comprises a number of sections, including: Arguments; Server Information; Data Collectors List; National Language Support; Machine Class Data; Machine Usage Data; Prefill Executable Definition; Static IP Address Justifications; No Migration Reasons; Supported Adapter Names; Installer List; Install Adapter Rules; Default Values; Site, Building and Floor Definitions; Input Checking Rules; Special Needs; Ship To For Mobile; MDO Devices; Not Complete Reasons; and Including Other INI Files.

The Arguments section provided several initialization parameters and settings, and the Server Information Section identifies the destination server to which the collected data is sent. The Data Collectors list section provides a list of data collectors, and the National Language Support Section is used to ensure that the collection tool uses the appropriate language. The Machine Class Data section defines possible selectable values for each machine class, and the Machine Usage Data section defines what the returned values will be when a machine usage is chosen. The Prefill Executable Definition section provides the information needed to prefill various fields, and the Static IP Address Justification section defines the list of justifications that can be selected for the need for a static IP address.

The No Migration Reasons section defines a list of reasons that a migration could not be done, and the Supported Adapter Names section gives a list of the supported adapter drive names that would be found by the tool. The Installer List section defines a list of installers, and the Install Adapter Rules section provides rules that are used to determine what adapter needs to be used during an install on a particular machine type and model. The Default Values section is used to define the install initial input values when data for a new machine is being collected; and the Sites, Building and Floor Definitions section is used to define a list of sites, buildings and floors available to the user.

The Input Checking Rules section defines the input checking rules for each text input field, and the Special Needs section lists a series of checkable items that a site needs to query during inventory. The Ship To For Mobile section contains settings that define the States of Provenance in the Ship To section of the mobile tool, and the MDO device section gives a list of Multiple Device Offering devices that can be selected when indicating what device was delivered to a desktop. The Not complete Reasons section defines a list of reasons that the migration may not be completed, and the Including Other INI Files section allows one control NI file to include other control INI files.

Figure 23:
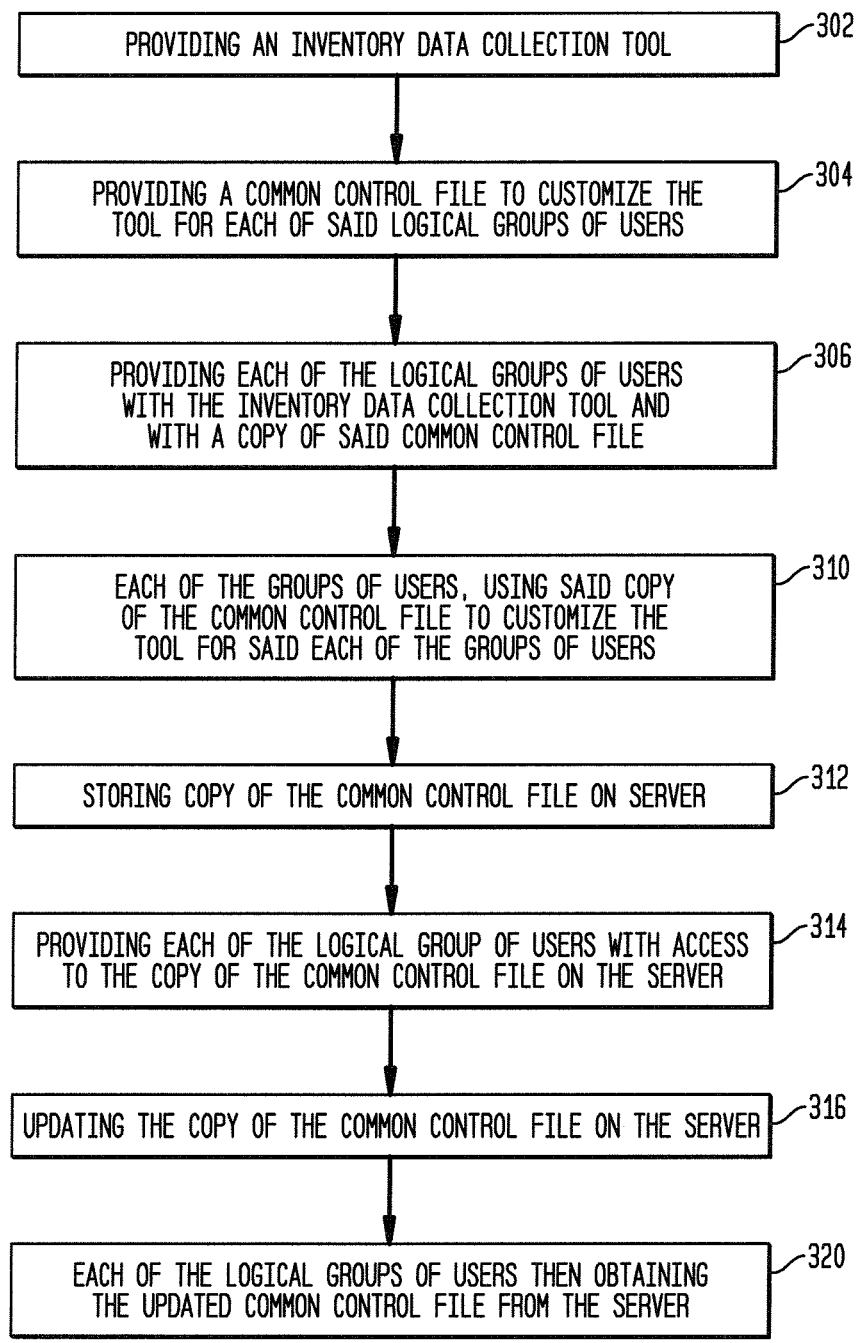
FIG. 23 is a flow chart outlining a preferred method for using a Control INI file in the implementation of the present invention.

FIG. 23 is a flow chart illustrating a preferred procedure for using this Control INI file. In this preferred procedure, at steps 302 and 304, respectively, an inventory data collection tool, and a single, common control file are provided. At step 306, each logical group of users is provided with the inventory data collection tool and a copy of that common control file. Each logical group of users can, as represented at 310, then use the common control file to customize the tool for that groups own inventory data collection process.

Also, in a preferred embodiment, as indicated at steps 312 and 314, the common control file is stored on a server, and each of the logical groups of users has access to that copy of the control file. In this way, when it is necessary or appropriate to update the control file it is necessary to update only the copy on the server, as represented at 316. Each of the logical groups of users can, as represented at 320, then obtain the updated common control file from the server.

The users do not have to use that updated control file, though. The users have a choice of using the copy of the control file already on the inventory data collection tool, or using the updated copy from the server. Preferably, if the user uses the copy of the control file already on the tool, the user is warned that he or she is using this copy and not the copy of the control file from the server.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A program storage device readable by machine, tangibly embodying a program of instructions executable by the machine to perform method steps for collecting inventory data about a group of machines at an office, the method steps comprising:

running an inventory tool on each of said machines;

the tool presenting dialogue displays on each of the machines;

receiving data in the dialogues presented by the tool; and submitting the collected information to a server; and wherein:

said running includes said inventory tool generating a respective one inventory file for each of the machines, and the inventory tools sending all of the respective inventory files to an identified dedicated client machine; and using the identified dedicated client machine to receive and to process the respective inventory files for all of the machines in said group of machines.

2. A program storage device according to claim 1, wherein the step of running an inventory tool includes the step of downloading the inventory tool over a network to at least one of the machines of said group.

3. A program storage device according to claim 2, wherein said method steps further comprise the step of downloading over the network a common control file for the tool.

4. A program storage device according to claim 3, wherein said method steps further comprise the step of updating the common control file.

5. A program storage device according to claim 1, wherein the submitting step includes the step of a specified one of the machines collecting inventory data from other machines in said group.

6. A program storage device according to claim 5, wherein the submitting step includes the step of said specified one of the machines submitting the collected information to the server.

7. A method of deploying a computer program product for collecting inventory data about a group of machines at an office, wherein when execute, the computer program performs the steps of:

running an inventory tool on each of said machines;

the tool presenting dialogue displays on each of the machines;

receiving data in the dialogues presented by the tool; and submitting the collected information to a server and wherein:

said running includes said inventory tool generating a respective one inventory file for each of the machines, and the inventory tools sending all of the respective inventory files to an identified dedicated client machine; and using the identified dedicated client machine to receive and to process the respective inventory files for all of the machines in said group of machines.

8. A method according to claim 7, wherein the step of running an inventory tool includes the step of downloading the inventory tool over a network to at least one of the machines of said group.

9. A method according to claim 8, wherein said method steps further comprise the step of downloading over the network a common control file for the tool.

10. A method according to claim 9, wherein said method steps further comprise the step of updating the common control file.

11. A method according to claim 7, wherein the submitting step includes the step of a specified one of the machines collecting inventory data from other machines in said group.

12. A method according to claim 11, wherein the submitting step includes the step of said specified one of the machines submitting the collected information to the server.

* * * * *